March 23, 1926.

W. CARNEGIE

TURNING AND BORING TOOL

Filed May 25, 1925

INVENTOR
William Carnegie,
By Watson, Coit, Moser & Grindle,
ATTYS.

Patented Mar. 23, 1926.

1,577,952

UNITED STATES PATENT OFFICE.

WILLIAM CARNEGIE, OF SHEFFIELD, ENGLAND.

TURNING AND BORING TOOL.

Application filed May 25, 1925. Serial No. 32,777.

*To all whom it may concern:*

Be it known that I, WILLIAM CARNEGIE, a subject of the King of Great Britain, residing at Sheffield, in Yorkshire, England, have invented certain new and useful Improvements in or Relating to Turning and Boring Tools (for which I filed an application for patent in Great Britain on 6th May, 1924, No. 11,160); and I do hereby declare that the following is a full, clear, and exact description of the same.

This invention relates to turning and boring tools of the type comprising a cutter in the form of a truncated cone rotatably mounted in an inverted position on a suitable holder so that the cutting edge between the conical side and exposed face (which is the base of the cone and may be hollowed) may be renewed when worn by slightly turning the cutter in its holder, the object of the invention being to provide improved means for mounting the cutter on the holder.

It is, of course, known for tools to project out from a recess in a holder but according to the present invention a turning and boring tool of the type referred to comprises a conical cutter and a holder having parallel clamping surfaces adapted to be clamped in the usual slide rest or tool carrier, and formed with a conical recess corresponding in taper and smaller diameter to the cutter but having a gap in its side wall at the end or corner of the holder for a distance less than half the circumference. The cutter is thus adequately supported over a large proportion of its exterior surface, its operative cutting edge projecting out through the gap in the recess wall, although the whole cutter cannot pass through it. The axis of the conical recess is preferably inclined to the clamping surfaces of the holder so that the projecting cutting edge of the cutter is presented at the desired angle to the work. The end of the holder which contains the recess may be inclined to its clamping surfaces so as to have a surface at right angles to the axis of the recess in order that the cutting edge of the cutter may be contained in a plane parallel to the adjoining surface of the holder.

The cutter may be secured in the recess by the engagement with its exposed edge or face of the head of a bolt or the like in a hole parallel to the axis of the recess and substantially opposite the gap in the recess wall, and the adjacent surface of the holder may be recessed around the bolt hole to receive the head of the bolt and thus to enable it to clamp the cutter after the latter has been reduced in thickness by a subsequent grinding operation.

If desired the cutter may engage a stud projecting into the conical recess and this stud may be formed with a collar fitting the bottom of the recess and in contact with the cutter, the stud extending through the hole co-axially with the recess.

In the accompanying drawings:—

Like letters indicate like parts throughout the drawings.

Figure 1:
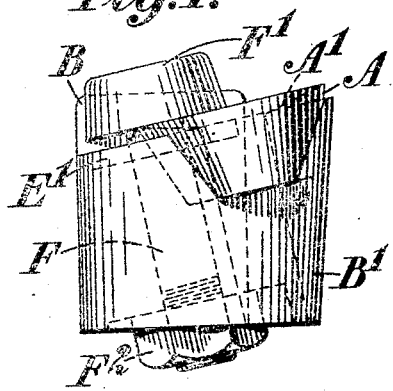
Figure 1 is an end view of a turning and boring tool according to the present invention.
Figure 3:
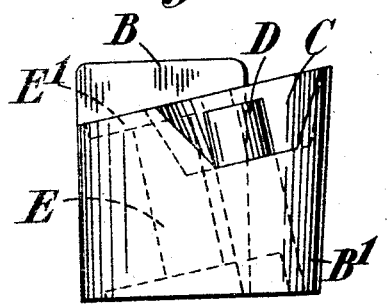
Figure 3 is an end view of the holder shown in Figures 1 and 2.
Figure 2:
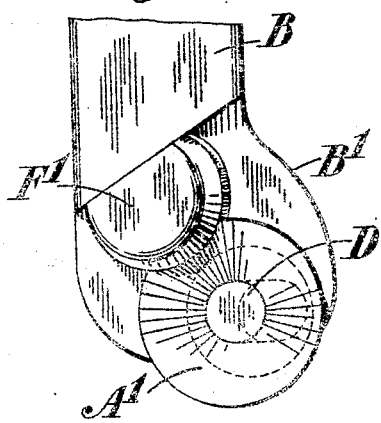
Figure 2 is a plan of Figure 1.
Figure 4:
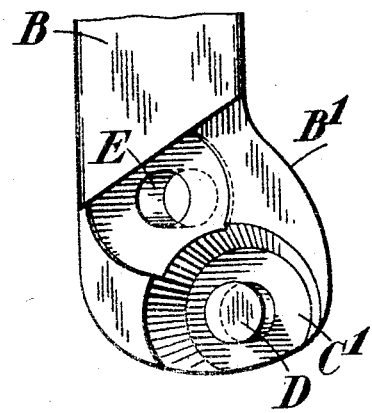
Figure 4 is a plan of Figure 3.

In the construction illustrated in Figures 1, 2, 3 and 4 the cutter A is of a known type, being in the form of a truncated cone having a central cylindrical boring, its exposed face $A^1$ (which is the base of the cone) being hollowed as shown.

The main body B of the holder is of any desired shape having parallel clamping surfaces suitable for being clamped in the usual slide rest or tool carrier. The holder is formed with a conical recess C in its upper surface in the end $B^1$ of the main body B. The conical recess C corresponds in taper and in smaller diameter to the cutter A, the bottom $C^1$ of the recess being its smaller diameter and at right angles to its axis. The conical side wall of the recess C is not continuous, a portion thereof being open at the end or, preferably, at a rounded corner of the holder for a distance less than half the circumference so that when the cutter A is in the recess C, a portion of it projects out from the holder, although the cutter cannot pass through the gap in the side wall of the recess.

A stud D is provided in the recess C and is co-axial therewith fitting the boring of the cutter A, although if desired the cutter A may be solid and the stud D dispensed with.

The recess C is sunk in the holder with its axis inclined at such an angle to the clamping surfaces of the holder that when the cutter A is contained in the recess one portion of its cutting edge projects through the gap referred to above with the adjacent surfaces presented at the desired angle to the work. In the construction illustrated the end B¹ of the holder containing the recess C is itself inclined to the clamping surfaces of the holder as seen clearly in Figures 1 and 3 so as to have a surface at right angles to the axis of the recess C so that the cutting edge of the cutter A is contained in a plane which is parallel to the adjacent surface of the holder.

When the holder is used with the recess C in its upper surface the cutter A may be simply placed in the recess C, and the tool be used with the cutter thus loose since the latter will be adequately supported by the base and conical side wall of the recess over the greater portion of its exterior surface. It is preferred, however, to clamp the cutter in the recess to enable the tool to be used in an inverted position and to prevent chattering of the cutter. For this purpose a hole E is formed in the end B¹ of the holder adjacent to the recess C and substantially opposite the gap in its side wall through which the cutter projects. The hole E is parallel to the axis of the recess C and a bolt F is disposed in the hole E, the parts being so proportioned that the head F¹ of the bolt F overlaps and engages the exposed edge or face of the cutter A which is thus clamped in position by a nut F² at the opposite side of the holder. The hole may be recessed as shown at E¹ around the hole E to receive the head F¹ of the bolt F and thus to enable it to clamp the cutter after the latter has been reduced in thickness by a subsequent grinding operation, since when the complete edge has been worn out a new one may be provided on the cutter by a simple grinding operation.

Figure 5:
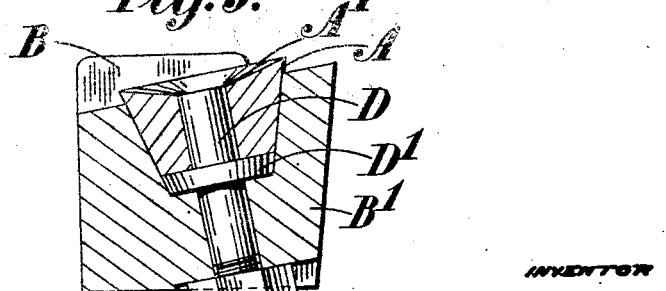
Figure 5 is a sectional end view illustrating a modification.

In the modification illustrated in Figure 5 the stud D is formed with a collar D¹ fitting the bottom of the recess C and extends through the holder co-axially with the recess, being conveniently secured in place by a nut as illustrated. This forms a simple and strong method for providing the stud D and for enabling it to be easily replaced should the necessity arise.

What I claim is:—

1. A turning and boring tool comprising the combination with a conical cutter of a holder having parallel clamping surfaces adapted to be secured in the usual slide rest or tool carrier, the holder being formed with a conical recess corresponding in taper and smaller diameter to the cutter but having a gap in its side wall near the end of the holder for a distance less than half the circumference through which the cutter projects for its full height, substantially as and for the purpose specified.

2. A turning and boring tool comprising the combination with a conical cutter of a holder having parallel clamping surfaces adapted to be secured in the usual slide rest or tool carrier, the holder being formed with a conical recess corresponding in taper and smaller diameter to the cutter but having a gap in its side wall near the end of the holder for a distance less than half the circumference through which the cutter projects throughout its height, the axis of the conical recess being inclined to the clamping surfaces, substantially as and for the purpose specified.

3. A turning and boring tool comprising the combination with a conical cutter of a holder having parallel clamping surfaces adapted to be secured in the usual slide rest or tool carrier, the holder being formed with a conical recess corresponding in taper and smaller diameter to the cutter but having a gap in its side wall near the end of the holder for a distance less than half the circumference, the axis of the conical recess being inclined to the clamping surfaces, and the end of the holder containing the recess having a surface at right angles to the axis of the recess, substantially as and for the purpose specified.

4. A turning and boring tool comprising the combination with a conical cutter of a holder having parallel clamping surfaces adapted to be secured in the usual slide rest or tool carrier, the holder being formed with a conical recess corresponding in taper and smaller diameter to the cutter but having a gap in its side wall near the end of the holder for a distance less than half the circumference, and a bolt in a hole in the holder beyond the recess and parallel to its axis, the bolt having a head engaging the exposed edge of the cutter substantially opposite the gap in the recess wall, substantially as and for the purpose specified.

5. A turning and boring tool comprising the combination with a conical cutter of a holder having parallel clamping surfaces adapted to be secured in the usual slide rest or tool carrier, the holder being formed with a conical recess corresponding in taper and smaller diameter to the cutter but having a gap in its side wall for the full height thereof near the end of the holder for a distance less than half the circumference, a bolt in a hole in the holder beyond the recess and parallel to its axis, the bolt having a head engaging the exposed edge of the cutter substantially opposite the gap in the recess wall, and the adjacent surface of the holder being recessed around the bolt hole, substantially as and for the purpose specified.

In testimony whereof I hereunto affix my signature.

WILLIAM CARNEGIE.